W. B. HAENSEL.
NUT LOCK.
APPLICATION FILED JUNE 20, 1910.
985,587.
Patented Feb. 28, 1911.
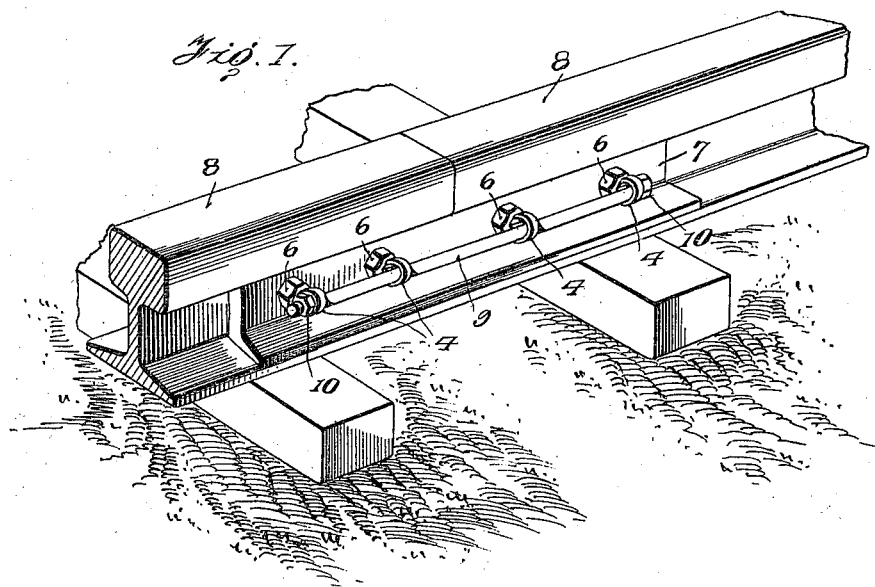
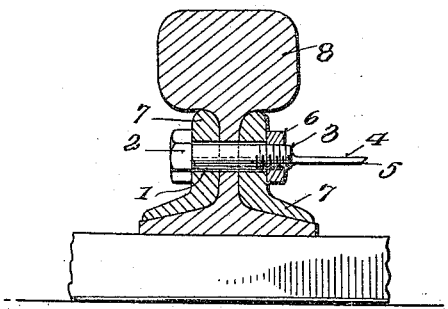
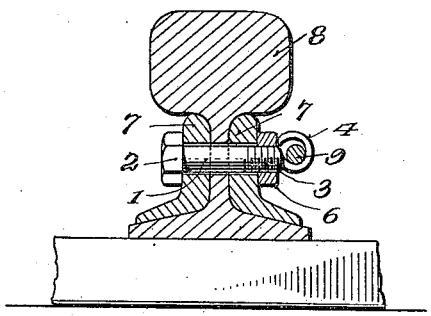
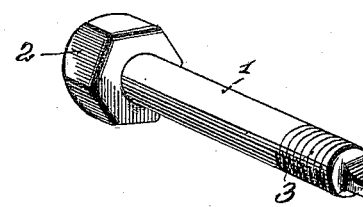
Witnesses
W. N. Woodson
Juana M. Fallin
Inventor
W. B. Haensel
By H. M. Macey, Attorneys.

UNITED STATES PATENT OFFICE.

WILLIAM B. HAENSEL, OF NEW ORLEANS, LOUISIANA.

NUT-LOCK.

985,587.

Specification of Letters Patent. Patented Feb. 28, 1911.

Application filed June 20, 1910. Serial No. 568,031.

*To all whom it may concern:*

Be it known that I, WILLIAM B. HAENSEL, citizen of the United States, residing at New Orleans, in the parish of Orleans and State of Louisiana, have invented certain new and useful Improvements in Nut-Locks, of which the following is a specification.

The present invention comprehends certain new and useful improvements in nut locks, and the invention has for its object an improved device of this character which is quite simple, durable, and inexpensive, and which is designed particularly for use in connection with rail joints, although it is not limited to any such use but is susceptible of general application.

Another object of the invention is a nut lock which is thoroughly practical and reliable and which may be easily and quickly applied without the necessity of employing skilled labor or special tools.

A further object of the invention is a bolt having a reduced locking tongue extending from the threaded end thereof, the tongue being adapted to be bent into the form of a loop to bear terminally against the outer face of the nut to positively retain the same against loosening movement.

A still further object of the invention is a nut lock of this character in which a pin is adapted to be inserted through the loops of a plurality of adjacent bolts in order to reinforce such loops and to lock all of the bolts against turning movement.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which:

Figure 1 is a sectional perspective view of a rail joint equipped with my improved nut locks; Fig. 2 is a transverse section thereof showing one of the locking tongues in its initial or inoperative position; Fig. 3 is a similar view with the locking tongue bent into operative position and with the pin positioned within the tongue; and Fig. 4 is a detail perspective view of one of the bolts.

Corresponding and like parts are referred to in the following description and indicated in all the views of the drawing by the same reference characters.

My improved nut lock consists essentially of a bolt 1 that is formed at one end with a suitable head 2 and that is exteriorly threaded in proximity to its other end, as indicated at 3. Extending centrally from the threaded end of the bolt is a reduced locking tongue 4 which is rigid with the bolt and is preferably formed integral therewith. This tongue is capable of being bent, and has a beveled extremity 5 for a purpose to be presently disclosed. The tongue may be of any suitable length and has any suitable cross sectional contour, according as desired. However, in the present instance the tongue is preferably flattened, as shown, so as to be adapted to be more readily bent. In its normal position the tongue is substantially straight and is disposed in the direction of the axis of the bolt in order to permit a nut 6 to be passed freely thereover into engagement with the threaded portion 3. The nut is of the ordinary form.

For the purpose of illustration, the invention is shown as applied to a rail joint, a plurality of bolts 1 being inserted through the registering openings in the fish plates 7 and the meeting ends of the rail sections 8. The locking tongues 4 all project laterally from the same side of the rail. The nuts 6 are slipped over the respective locking tongues and screwed up tight against the adjacent fish plate. The locking tongues are similarly returned upon themselves to form substantially circular loops, the beveled extremities of the locking tongues bearing firmly against the outer faces of the nuts to positively lock the same against loosening movement. The loops are all arranged in axial alinement so as to be adapted to receive a pin or rod 9 which is inserted longitudinally therethrough and serves primarily to lock all of the bolts against relative turning movement. The pin is provided at its ends with stops 10 which abut against the extreme locking tongues to hold the pin against longitudinal displacement. In the present instance one of these stops is in the form of an integral head, while the other stop is in the form of a nut and is screw-threaded on the pin.

It is to be particularly observed that as the beveled extremity 5 bears against the outer face of the nut, it is not necessary to unbend the loop preparatory to turning the nut still tighter against the work, when occasion requires. After the nut has been retightened it is merely necessary to bend the loop slightly so that the beveled extremity thereof is again engaged with the outer face of the nut. The nuts may thus be independently tightened and the locking tongues reset without the necessity of removing the pin 10.

In practice the loops are never unbent unless it becomes necessary to remove the nuts from the bolts.

From the foregoing description in connection with the accompanying drawing it will be apparent that I have provided an improved nut lock which may be advantageously employed in connection with jarring machinery or for other purposes where a positive lock is necessary or desired. Furthermore, the application of the nut lock may be expeditiously effected inasmuch as the tongue may be readily bent into an operative position with the use of a hammer or pair of pliers or like ordinary tools.

Having thus described the invention, what I claim is:

1. In a nut lock, the combination of a plurality of threaded bolts, nuts working on the respective bolts, each bolt having its extremity bent beyond the nut to form a loop for holding the nut against removal, and a member inserted in all of the loops to hold the bolts against relative turning movement.

2. In a nut lock, the combination of a plurality of threaded bolts, nuts working on the respective bolts, a reduced locking tongue extending from the threaded end of each bolt and bent to form a loop for holding the nut against removal, and a pin inserted in all the loops to hold the bolts against relative turning movement.

3. In a rail joint, the combination with the meeting ends of companion rail sections and a fish plate fitting against one side of the rail and spanning the joint, of threaded bolts passed through the fish plate and the respective meeting ends of the rail sections, nuts working on the bolts, the extremity of each bolt being bent beyond the nut to form a loop for holding the nut against removal, and a member spanning the joint between the rail sections and inserted in all of the loops to hold the bolts against relative turning movement.

In testimony whereof, I affix my signature in presence of two witnesses.

WILLIAM B. HAENSEL. [L. S.]

Witnesses:
W. W. YOUNG,
T. J. DOBBIN.

---

Copies of this patent may be obtained for five cents each, by addressing the "Commissioner of Patents, Washington, D. C."